March 25, 1930.                J. MULDER                    1,751,875
                    AUTOMATICALLY TIMED ELECTRICAL DEVICE
                          Filed May 26, 1928          2 Sheets-Sheet 1
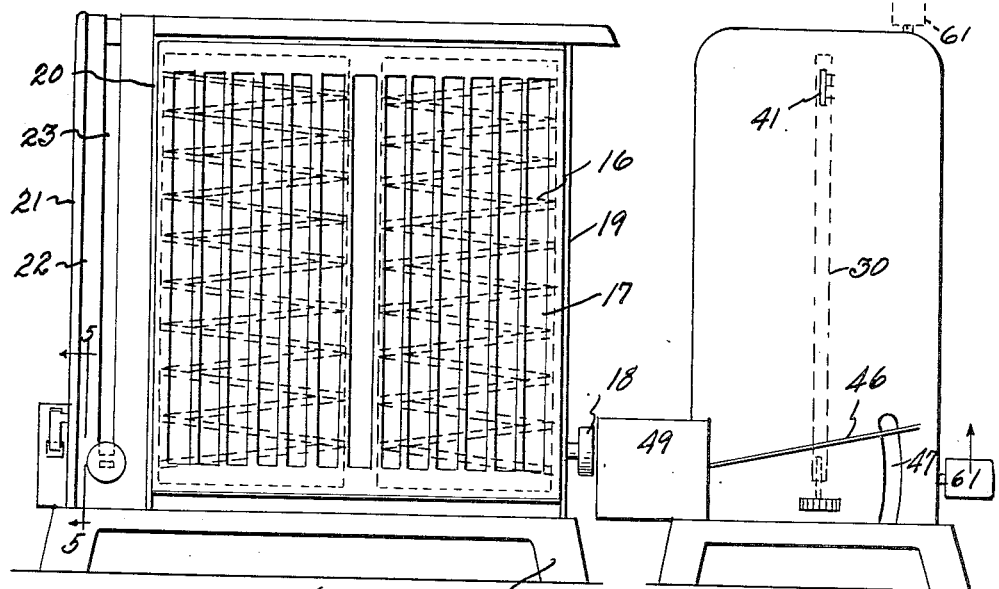
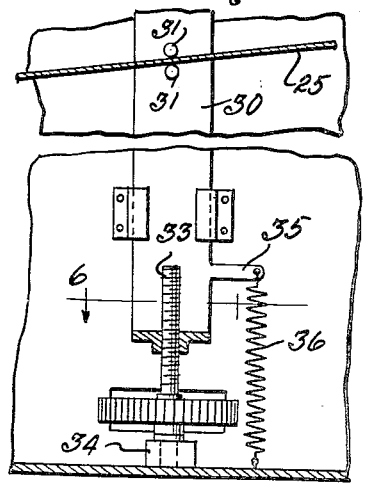
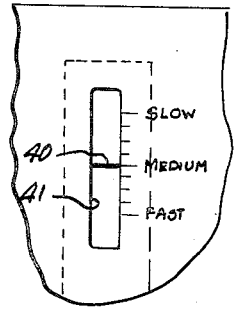
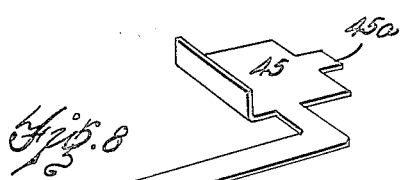
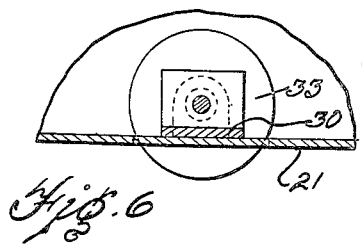
INVENTOR.
Jentje Mulder
BY
Underwood & Hardesty
ATTORNEYS March 25, 1930.   J. MULDER   1,751,875
AUTOMATICALLY TIMED ELECTRICAL DEVICE
Filed May 26, 1928   2 Sheets-Sheet 2

INVENTOR.
Jentje Mulder
BY Underwood & Hardesty
ATTORNEYS

Patented Mar. 25, 1930

1,751,875

UNITED STATES PATENT OFFICE

JENTJE MULDER, OF DETROIT, MICHIGAN

AUTOMATICALLY-TIMED ELECTRICAL DEVICE

Application filed May 26, 1928. Serial No. 280,787.

The present invention relates to automatically timed electrical devices, such as household appliances, and particularly to automatic switch devices for breaking a circuit through such an appliance after a predetermined period of operation and to means for varying the timing.

Among the objects of the invention is to simplify such timing means and timing adjustment so as to render them easily and economically made as well as efficient in operation.

Another object is the application of such devices to household appliances, such as a bread toaster.

Other objects will readily occur to those skilled in the art upon reference to the following description and the accompanying drawings, in which Fig. 1 is a side elevation of a toaster embodying the present invention.

Fig. 2 is an end elevation thereof.

Fig. 5 is a section on line 5—5 of Fig. 1.

Fig. 6 is a section on line 6—6 of Fig. 5, and

Figs. 7 and 8 are enlarged detail views of parts of the device.

Figures 3, 4:
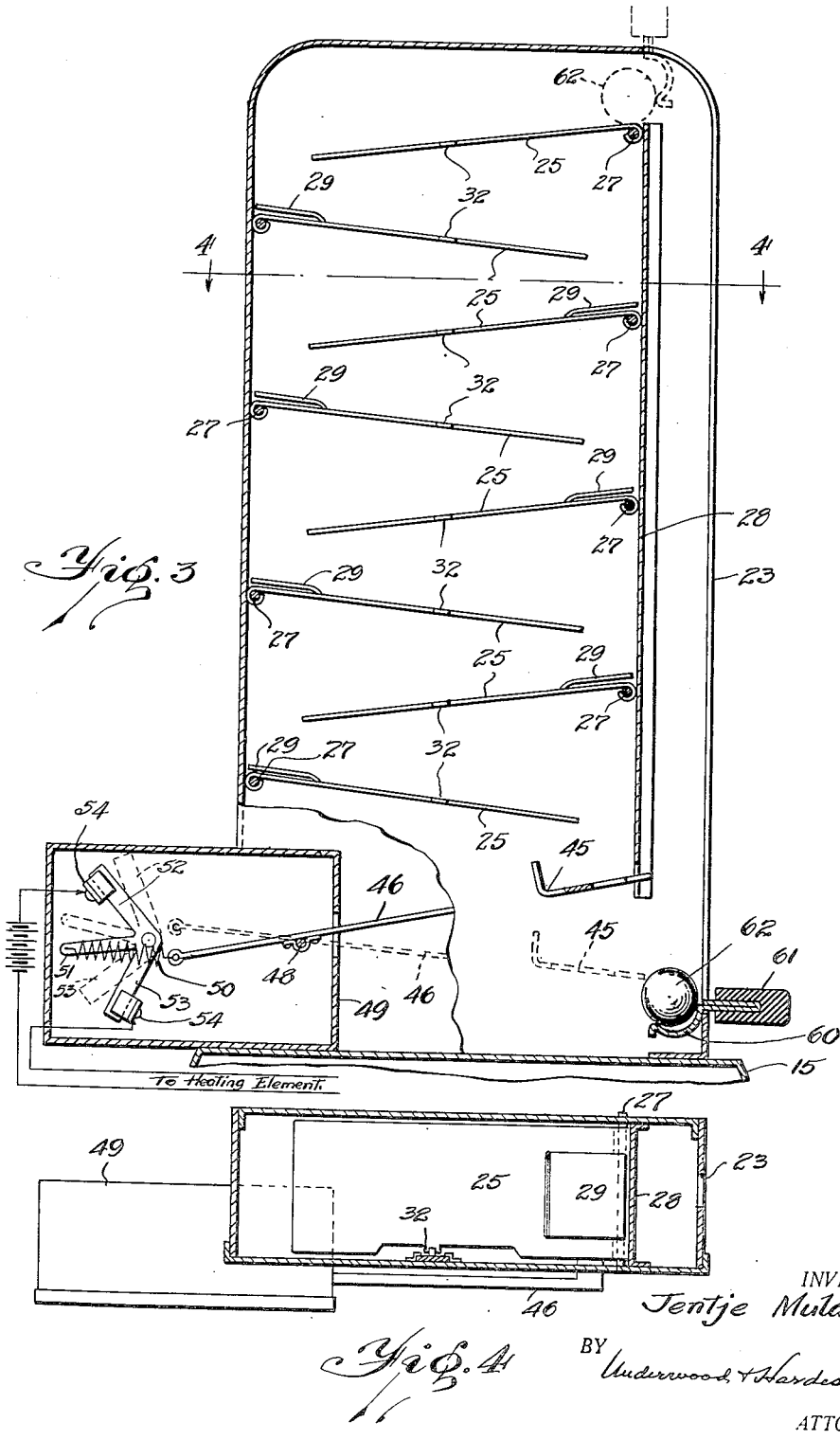
Fig. 3 is an end view with parts in section and with the end cover plate removed to show the mcehanism.
Fig. 4 is a section on line 4—4 of Fig. 3.

As indicated in the drawings, the toaster consists of a base member 15 upon which are mounted in a vertical plane, heating filaments 16 and the bread racks 17 which may be operated in the usual manner by means of the knobs 18. At one end of the toaster will be the usual end plate 19 and at the other end may be a second end plate 20. Outside of the second end plate 20 a chamber will be formed by means of a third end plate 21 and a side wall member 22 which latter on one side of the toaster will be provided with a slot 23 extending from near the bottom up to the top and a part of the way across the top. The extent of the slot 23 will best be noted in Figure 3.

Inside of the chamber just mentioned is a series of staggered shelves 25 which extend one over the other from alternate sides of the chamber as shown best in Figure 3. These shelves will be hinged between plates 20 and 21 either upon pins 27 set in the two plates or in any other suitable fashion. Some of the shelves will be hinged at one side of the chamber and the others at the other side which will be designated the front side.

Near the front side a vertical partition 28 will be secured and this partition will be a short distance behind the slot 23. Each of the shelves except the top one will be provided near the hinge with a spring portion 29 for a purpose to be hereinafter indicated.

Near the center of the shelves they will be supported upon a vertically extending slidable member 30 indicated best in Figures 2 and 5. Any suitable means for supporting the shelves on the member 30 may be used, such as the spaced pins 31 shown in Figure 5 or projections 32 on the side of the shelf may be inserted in suitable openings in the member 30. Such projections are indicated at 32 in Figure 3.

The bottom end of member 30 is bent to a horizontal position and provided with a threaded opening for the reception of a thumb screw 33 rotatably mounted in the bottom of the chamber in a boss 34 and at one side the member 30 will be provided with an arm 35 to which is secured a spring 36 attached at its other end to the bottom of the chamber, as shown best in Figure 5. By rotation of the thumb screw 33, the inclination of the several shelves may be varied and it is preferred to provide on the member 30 a mark 40 which is visible through a suitable opening 41 in the end plate 21 and the edge of the opening may be graduated, as indicated in Figure 5.

Below the lowermost shelf 25 is a small platform 45 which is formed as a laterally projecting part of a lever 46 located preferably outside of the shelf chamber, the connection between the platform 45 and lever 46 extending through a suitable arc shaped slot 47 in the end plate 21.

This lever 46 is pivoted as at 48 in a switch housing 49 mounted on the base 15 and at its other end is connected to a spring 50 which, in turn, is connected to the switch arm 51 of a suitable overthrow switch. The other two arms 52 and 53 of the switch member will in one position make contact with the contact members 54 and in its other position break the circuit.

Mounted in the slot 23 is a suitable sliding cup member 60 having a handle 61 projecting to the outside, which cup member is adapted to receive a metal ball 62 and serves to elevate the ball 62 to the dotted line position shown in Figure 3. When the handle 61 is moved to the upper end of the slot, the cup member is tilted and the ball dropped therefrom on the uppermost shelf 25.

Through the force of gravity, the ball then travels down over the several shelves 25, being somewhat delayed by striking the spring portions 29 and bounding against the shelf ends, until it rolls from the lowermost shelf upon the platform 45. When the ball drops upon the platform 45, its weight and the force of its blow will carry down the platform to the dotted line position and in so doing, causes the switch arms 52 and 53 to move to their dotted line position and thus break the circuit.

When it is desired to re-make the circuit, the ball is lifted by means of a handle 61 and in the first part of its movement, carries up with it the platform 45 by virtue of the small extension 45ª with which the ball contacts and thereby throws the switch lever 53 back to the full line position.

If it is found that the ball in its downward trip requires more time, the member 30 is lifted by means of the thumb screw 33 and thereby decreases the inclination of the platforms 25; lowering the member 30 will correspondingly shorten the time of the closed circuit position of the switch.

Now having described the invention and the preferred form of embodiment thereof, it is to be understood that the said invention is to be limited not to the specific details herein set forth but only by the scope of the claims which follow.

I claim:—

1. A timing device for electrical appliances, comprising an overthrow switch adapted to be actuated by the movement of a lever in a vertical plane, a platform on said lever, and means for causing a weight to drop on said platform and thereby actuate said lever and cause the latter to actuate said switch, said means comprising a vertical series of inclined shelves above said platform, each shelf inclined toward the one next below with the lowermost inclined toward said platform, and a spherical weight adapted to be placed upon the topmost shelf and to roll over said shelves in series and drop upon the said platform whereby to actuate the said lever and thereby said switch.

2. A timing device for electrical appliances, comprising an overthrow switch adapted to be actuated by the movement of a lever in a vertical plane, a platform on said lever, and means for causing a weight to drop on said platform and thereby actuate said lever and cause the latter to actuate said switch, said means comprising a vertical series of inclined shelves above said platform, each shelf inclined toward the one next below with the lowermost inclined toward said platform, and a spherical weight adapted to be placed upon the topmost shelf and to roll over said shelves in series and drop upon the said platform whereby to actuate the said lever and thereby said switch, a receiver into which said weight is adapted to roll from said platform after switch actuation, means for lifting said weight and depositing it upon the topmost shelf, and means cooperating with the last mentioned means to return said platform to weight receiving position when said lifting is being done.

3. A timing device for electrical appliances, comprising an overthrow switch adapted to be actuated by the movement of a lever in a vertical plane, a platform on said lever, and means for causing a weight to drop on said platform and thereby actuate said lever and cause the latter to actuate said switch, a vertical series of inclined shelves above said platform, each shelf inclined toward the one next below with the lowermost inclined toward said platform, a spherical weight adapted to be placed upon the topmost shelf and to roll over said shelves in series and drop upon the said platform whereby to actuate the said lever and thereby said switch, and means for changing the inclination of said shelves.

4. A timing device for electrical appliances, comprising an overthrow switch adapted to be actuated by the movement of a lever in a vertical plane, a platform on said lever, and means for causing a weight to drop on said platform and thereby actuate said lever and cause the latter to actuate said switch, said means comprising a vertical series of inclined shelves above said platform, each shelf inclined toward the one next below with the lowermost inclined toward said platform, a spherical weight adapted to be placed upon the topmost shelf and to roll over said shelves in series and drop upon the said platform whereby to actuate the said lever and thereby said switch, means for delaying the progress of said weight when passing from one shelf to a succeeding shelf, and means for changing the inclination of said shelves.

5. A timing device for electrical appliances, comprising an overthrow switch adapted to be actuated by the movement of a lever in a vertical plane, a platform on said lever, and means for causing a weight to drop on said platform and thereby actuate said lever and cause the latter to actuate said switch, said means comprising a vertical series of inclined shelves above said platform, each shelf inclined toward the one next below with the lowermost inclined toward said platform, a spherical weight adapted to be placed upon the topmost shelf and to roll over said shelves in series and drop upon the said platform whereby to actuate the said lever and thereby said switch, and means for delaying the progress of said weight when passing from one shelf to a succeeding shelf.

JENTJE MULDER.